(12) United States Patent
Sanchez

(10) Patent No.: US 10,077,981 B2
(45) Date of Patent: Sep. 18, 2018

(54) LEVEL VIAL

(71) Applicant: Stanley Black & Decker Inc., New Britain, CT (US)

(72) Inventor: Albert Sanchez, Naugatuck, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 187 days.

(21) Appl. No.: 15/199,280

(22) Filed: Jun. 30, 2016

(65) Prior Publication Data

US 2018/0003497 A1   Jan. 4, 2018

(51) Int. Cl.
*G01C 9/34* (2006.01)

(52) U.S. Cl.
CPC ........................ *G01C 9/34* (2013.01)

(58) Field of Classification Search
CPC ........................................... G01C 9/34
USPC ...................................... 33/379, 389
See application file for complete search history.

(56) References Cited

U.S. PATENT DOCUMENTS

| | | | | |
|---|---|---|---|---|
| 2,634,509 A * | 4/1953 | Roberts | ........... | G01C 9/34 33/381 |
| 4,860,459 A * | 8/1989 | Dengler | ........... | G01C 9/28 33/379 |
| 5,709,034 A * | 1/1998 | Kohner | ........... | G01C 9/28 33/365 |
| 6,176,020 B1 * | 1/2001 | Scarborough | ........... | G01C 9/28 33/379 |
| 7,472,487 B2 * | 1/2009 | Tran | ........... | G01C 9/24 33/379 |
| 2003/0009893 A1 * | 1/2003 | Jacoff | ........... | B29C 45/44 33/379 |
| 2004/0025360 A1 * | 2/2004 | Obergoenner | ........... | G01C 9/28 33/382 |
| 2005/0155241 A1 * | 7/2005 | Scheyer | ........... | G01C 9/32 33/379 |
| 2007/0266577 A1 * | 11/2007 | Tran | ........... | G01C 9/26 33/379 |
| 2010/0218391 A1 * | 9/2010 | Christianson | ........... | G01C 9/28 33/379 |
| 2011/0162222 A1 * | 7/2011 | Ben-Josef | ........... | G01C 9/32 33/379 |
| 2012/0186092 A1 * | 7/2012 | Nikayin | ........... | G01C 9/26 33/379 |

* cited by examiner

*Primary Examiner* — Christopher Fulton
(74) *Attorney, Agent, or Firm* — Gabriel A. Haboubi

(57) ABSTRACT

A level vial includes an elongated vial liquid housing extending along an axis of elongation and containing a liquid and a bubble therein, an outer support body supporting the elongated vial liquid housing, the outer support body being integral with the elongated vial liquid housing, and having an inner surface at least partially surrounding the elongated vial liquid housing, and an open space between the inner surface and the elongated vial liquid housing. The elongated vial liquid housing is shaped such that a horizontal orientation of the axis of elongation causes the liquid to flow such that the bubble floats to a center of the elongated vial liquid housing. The elongated vial liquid housing and the open space are in an outwardly exposed and unobstructed configuration relative to a front face of the level vial.

20 Claims, 11 Drawing Sheets

LEVEL VIAL

FIELD OF THE INVENTION

The present invention relates generally to levels, and more particularly to spirit vials for levels.

BACKGROUND OF THE INVENTION

Conventional levels typically have an elongated body with a reference surface, and one or more level vials, also known as spirit vials or bubble vials, inserted therein and calibrated with respect to the reference surface, so that a bubble floating on the liquid within the level vial aligns within a demarcated region of the level vial when the reference surface is itself level (e.g., when it is placed against a level surface), but floats out of the demarcated region when the reference surface is not level (e.g., when the reference surface is placed against a surface that is not itself level). Many conventional levels include a top vial which extends along the top of the level, parallel to the reference surface, and a pair of side vials that are supported in the sides of the level, and are visible from opposing faces of the level. Such side vials typically are oriented as plumb vials, perpendicular to and/or at a 45° angle relative to the reference surface.

Conventionally for such side vials, the vial liquid housing is formed as a tube that is subsequently assembled into a clear annular housing that surrounds the vial liquid housing on both sides, and allows the vial liquid housing to be supported in the level housing in a manner that is visible from opposing faces of the level. Typically the clear annular housing is formed as two halves, which are assembled together surrounding the vial liquid housing. In other conventional side vials, a block containing the vial liquid housing is formed integrally into a generally cylindrical housing body, where the housing body again forms opposing transparent circular disks supporting the block vial in between. It may be appreciated that in each of these conventional vial housings, having a generally cylindrical overall configuration designed for viewing from opposing sides, a transparent housing surface of the clear housing body is positioned between the vial liquid housing and a user of the level. While such clear housings provide adequate support for the vial liquid housings therein, it is understood that such transparent housing surfaces may become scratched or smudged, and may obscure magnification properties based on the curved configuration of the vial liquid housing supported within the clear housing bodies.

SUMMARY OF THE INVENTION

According to one aspect of this disclosure, a level vial includes an elongated vial liquid housing extending along an axis of elongation and containing a liquid and a bubble therein, an outer support body supporting the elongated vial liquid housing, the outer support body being integral with the elongated vial liquid housing, and having an inner surface at least partially surrounding the elongated vial liquid housing, and an open space between the inner surface and the elongated vial liquid housing. The elongated vial liquid housing is shaped such that a horizontal orientation of the axis of elongation causes the liquid to flow such that the bubble floats to a center of the elongated vial liquid housing. The elongated vial liquid housing and the open space are in an outwardly exposed and unobstructed configuration relative to a front face of the level vial.

According to another aspect of this disclosure, a level includes a reference surface, and a level vial fixed relative to the reference surface. The level vial includes an elongated vial liquid housing extending along an axis of elongation and containing a liquid and a bubble therein, an outer support body supporting the elongated vial liquid housing, the outer support body being integral with the elongated vial liquid housing, and having an inner surface at least partially surrounding the elongated vial liquid housing, and an open space between the inner surface and the elongated vial liquid housing. The elongated vial liquid housing is shaped such that a horizontal orientation of the axis of elongation causes the liquid to flow such that the bubble floats to a center of the elongated vial liquid housing. The elongated vial liquid housing and the open space are in an outwardly exposed and unobstructed configuration relative to a front face of the level vial.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only, and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of level vials in accordance with one or more embodiments are shown in the drawings, in which like reference numerals designate like elements. The drawings form part of this original disclosure in which.

DETAILED DESCRIPTION OF THE ILLUSTRATED EMBODIMENT(S)

FIGS. 1-7 illustrate various views of an embodiment of a level vial 10 which comprises an outer support body 20 surrounding a vial liquid housing 30. As shown, in an embodiment the level vial 10 may have a generally cylindrical configuration, where the outer support body 20 is generally annular, and is suitable for rotation of the level vial 10 to different orientations. For example, the level vial 10 may be oriented for use as a plumb vial (e.g., so that an axis of extension A of the vial liquid housing 30 can be oriented parallel to, perpendicular to, or at a 45° angle relative to a reference surface of a level), may be oriented as a pitch vial (e.g., so that the axis of extension A of the vial liquid housing 30 can be oriented at a 3°, 15° or 30° angle relative to a reference surface of a level), may be placed in an adjustable mounting in the level body for rotatable degree selection relative to the reference surface, or may be fixed at any other appropriate angle relative to the reference surface of a level. Accordingly, it may be appreciated that the naming of the various faces in the Description of the Drawings Section above, and terms herein such as front, rear, and side are merely used by example with reference to the Figures, and that the faces and orientation descriptors as described may be switched in various embodiments depending on the assembly of the level vial 10 into a level.

Figure 1:
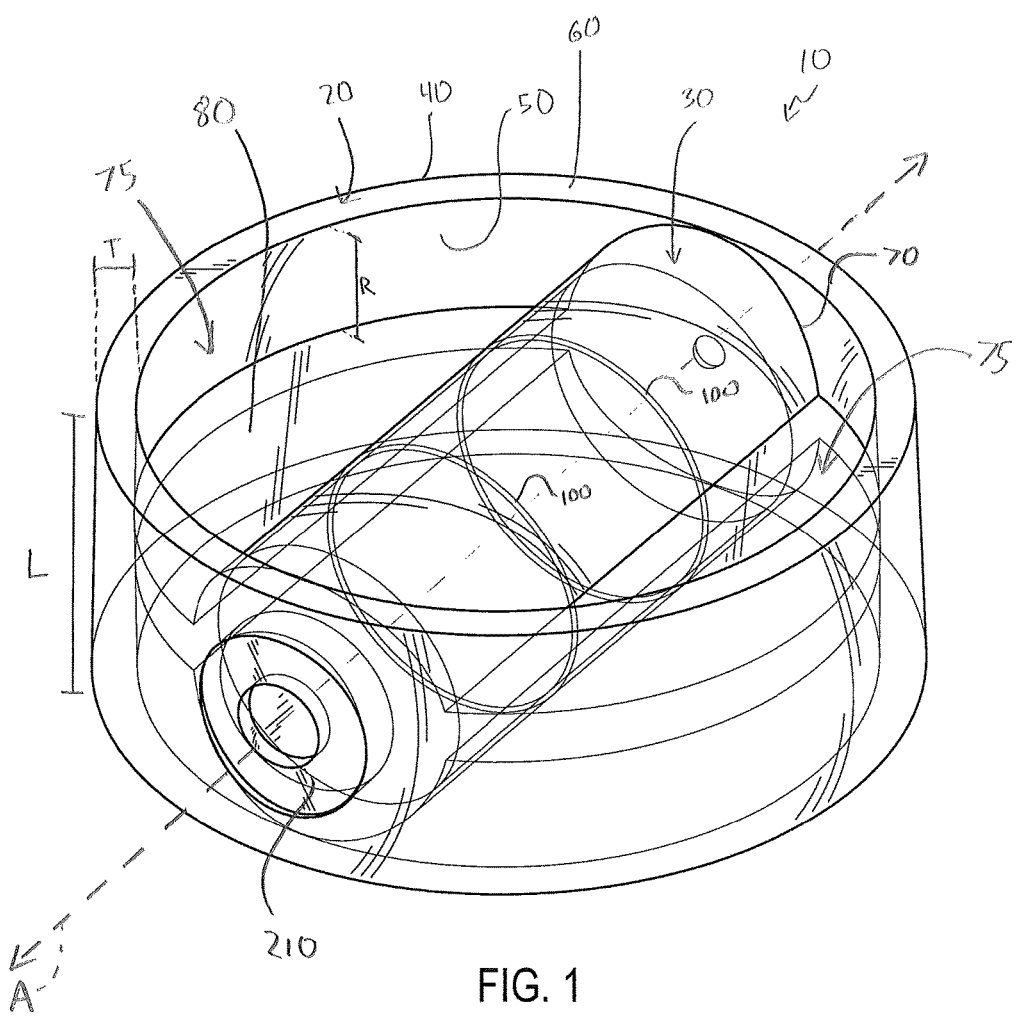
FIG. 1 illustrates a front perspective view of a level vial according to an aspect of the present disclosure.
Figure 2:
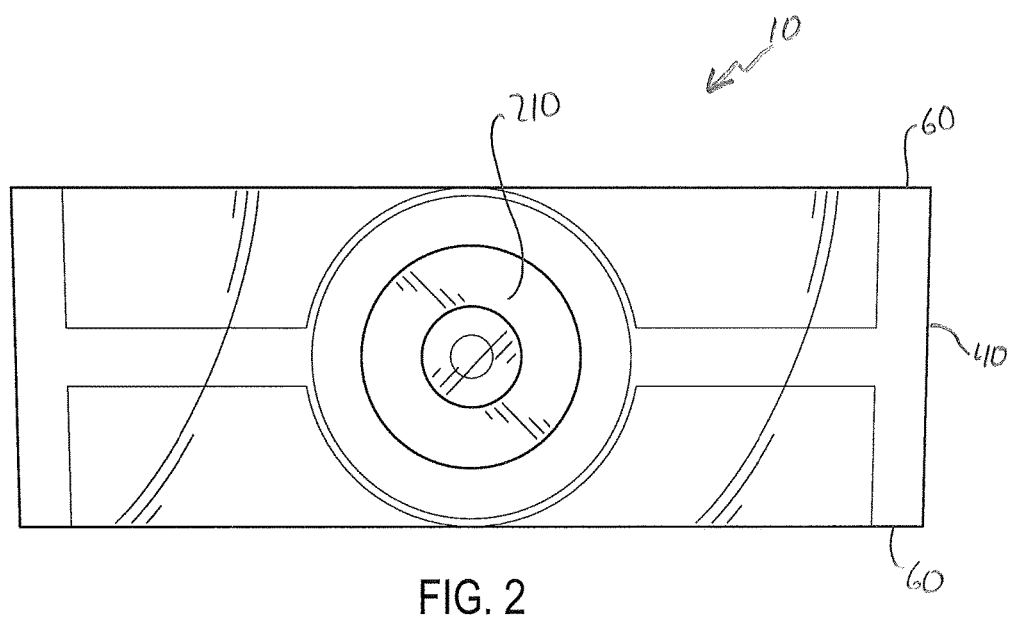
FIG. 2 illustrates a left side view of the level vial of FIG. 1.
Figure 3:
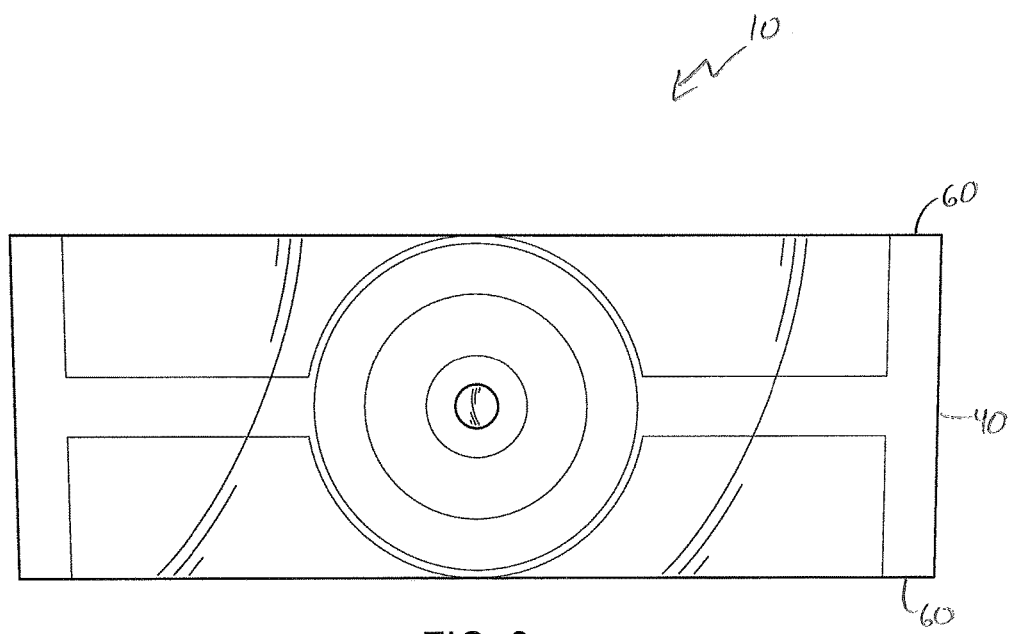
FIG. 3 illustrates a right side view of the level vial of FIG. 1.
Figure 4:
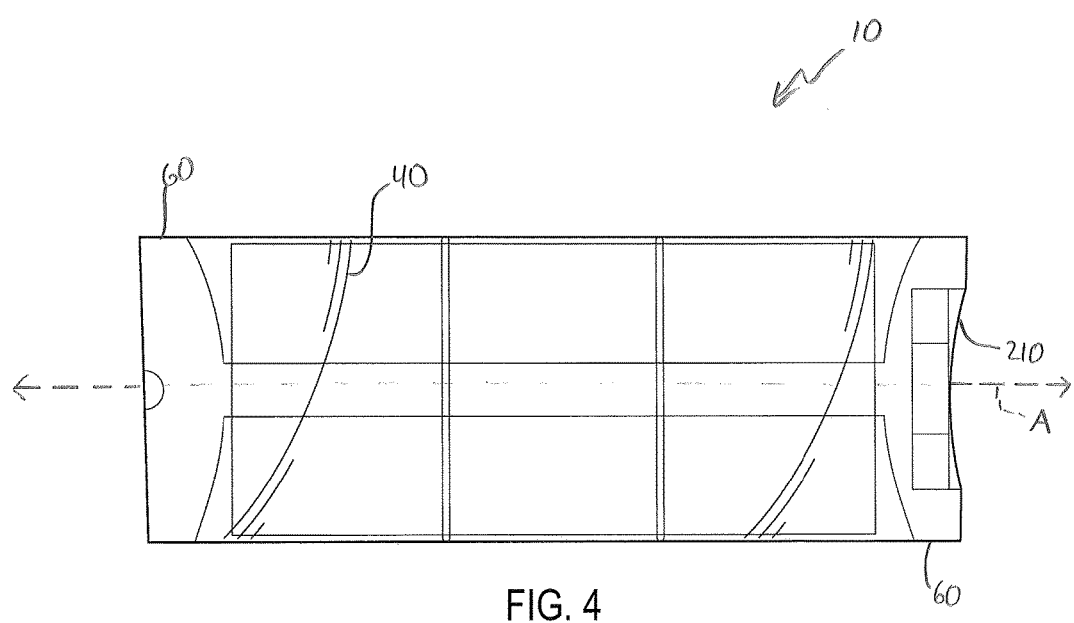
FIG. 4 illustrates a top view of the level vial of FIG. 1.
Figure 5:
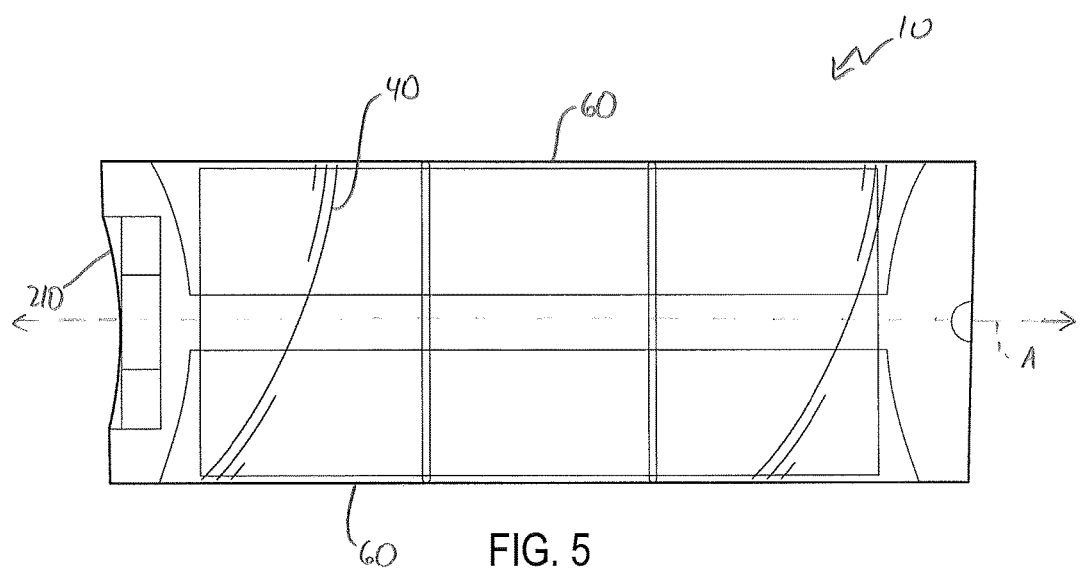
FIG. 5 illustrates a bottom view of the level vial of FIG. 1.
Figure 6:
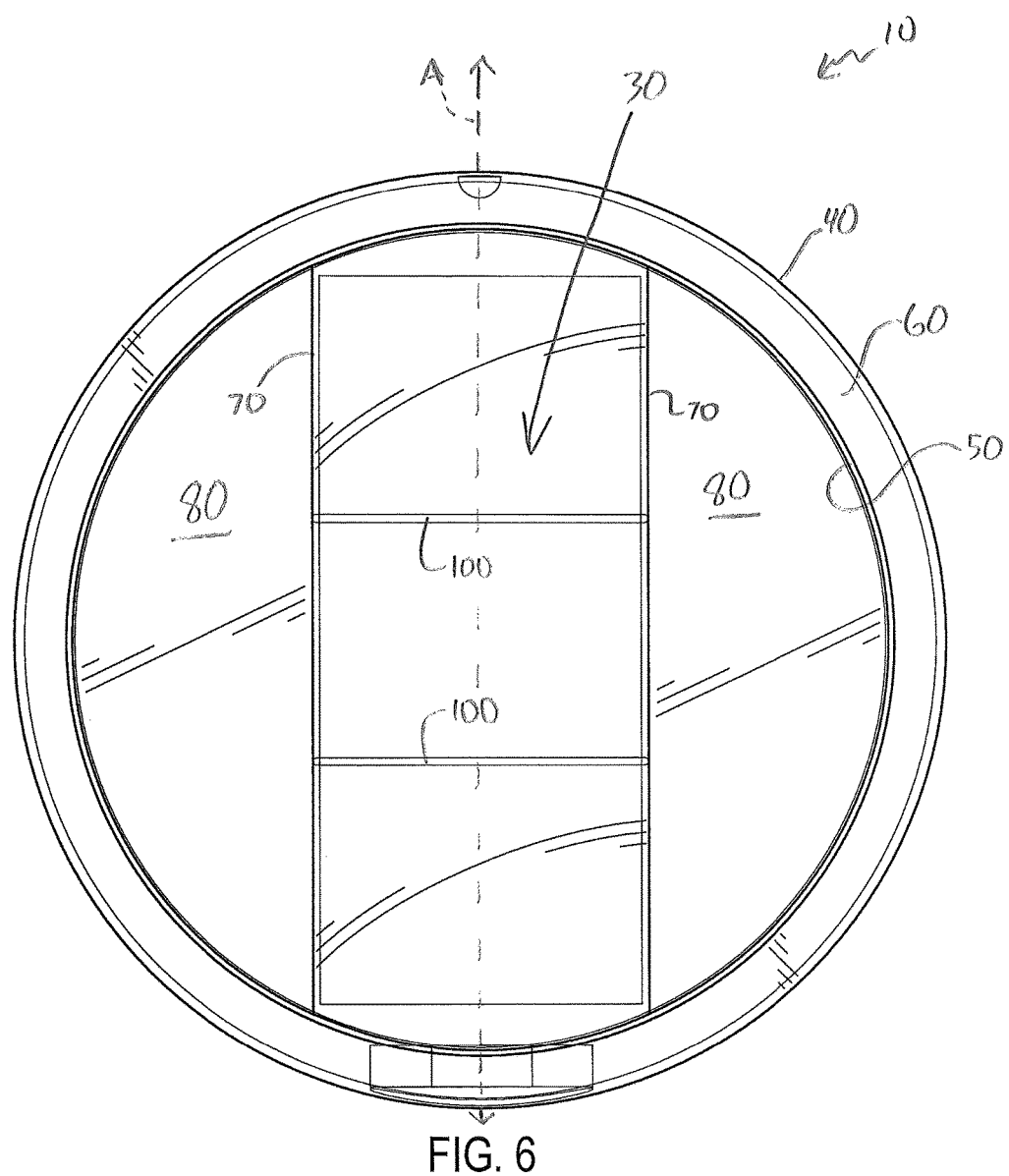
FIG. 6 illustrates a front view of the level vial of FIG. 1.
Figure 7:
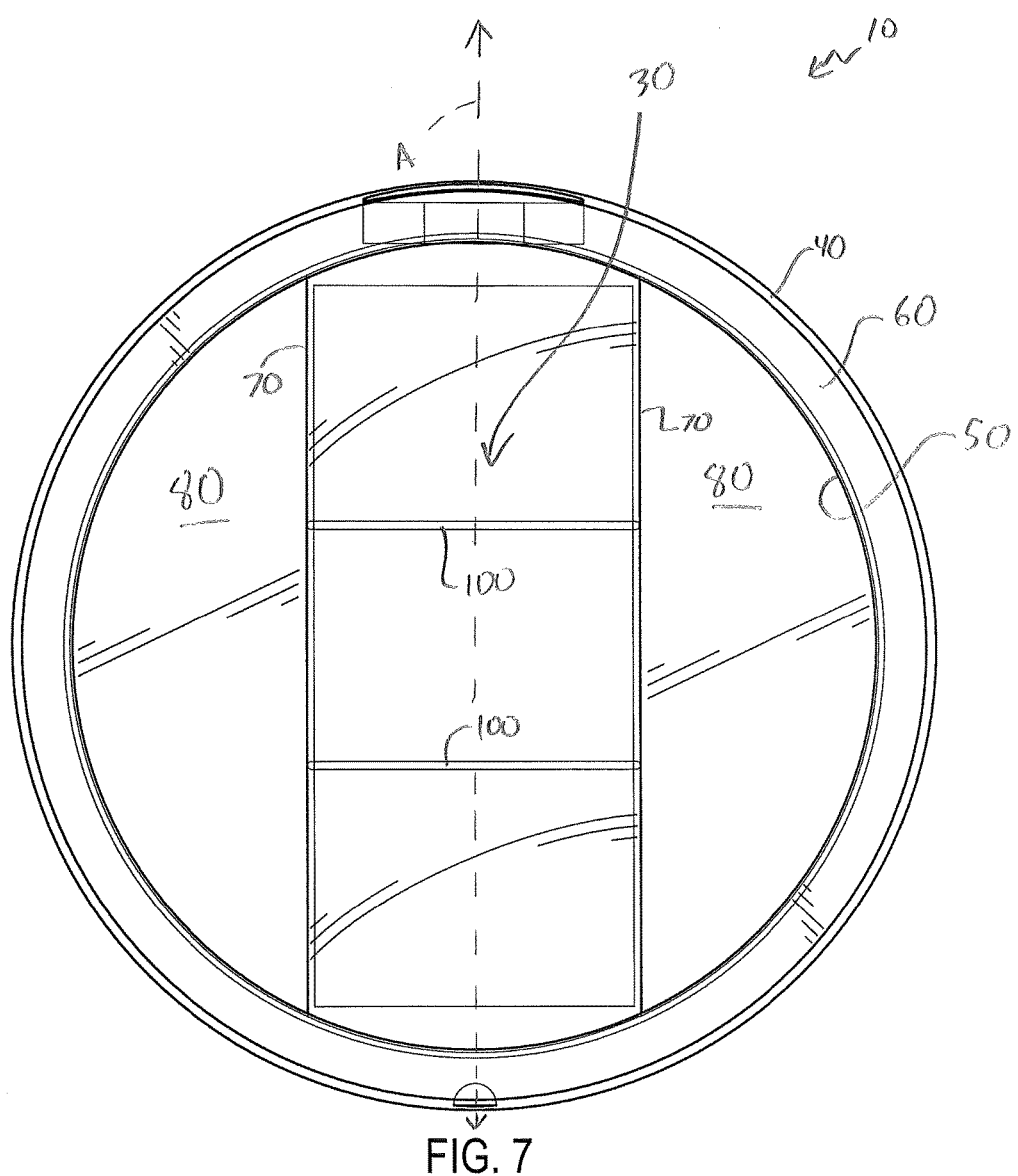
FIG. 7 illustrates a rear view of the level vial of FIG. 1.

As shown in the illustrated embodiment, the outer support body 20 may form a continuous loop around the vial liquid housing 30. In other embodiments, the outer support body 20 may be at least partially interrupted from the loop configuration. In an embodiment, the outer support body 20 may comprise an outer surface 40 and an inner surface 50, separated by a wall 60 that may define a thickness T of the outer support body 20. In some embodiments, the outer surface 40 and the inner surface 50 may have a common length L. In an embodiment the wall 60 on each opposing face of the outer support body 20 are parallel to the other. In an embodiment, either or both of the walls 60 extend generally perpendicularly to each of the outer surface 40 and the inner surface 50. While in some embodiments the general configuration is cylindrical, with a uniformly thick wall 60 between a generally cylindrical configuration of each of the outer surface 40 and inner surface 50, in other embodiments one or more of the as-illustrated straight line surfaces in the outer support body 20 (e.g., those defining the length of the outer support body 20) may be curved, such that the outer support body 20 more approximates or forms a toroidal shape, or creates a more complicated geometrical shape in whole or in cross section. It may be appreciated that the wall 60 on a front face of the level vial 10 as seen in FIG. 1 may have a different thickness T than the corresponding wall 60 on the rear face of the level vial 10 in some embodiments, and/or both walls 60 may deviate from an annular cross section, which in either case may cause the outer support body 20 to deviate from a generally cylindrical configuration. As may be appreciated from the views in FIGS. 2 and 3, the generally cylindrical configuration of the outer support body 20 in the illustrated embodiment of the level vial 10 is also (and more specifically) a generally frustoconical section, with the wall 60 on one face of the level vial 10 having a greater outer diameter than the wall 60 on the opposing face of the level vial 10. It may be appreciated that such a frustoconical configuration may facilitate molding of the level vial 10, as it may be easier to remove a frustoconical molded shape from a mold than a purely cylindrical configuration of molded shape. It may also be appreciated that in an embodiment a frustoconical shape of outer support body 20 may facilitate the shape serving as a locking taper, where it may engage a corresponding opening shape in a level housing, which may facilitate holding the level vial 10 in the level housing. In some embodiments, the outer support body 20 may be considered frustoconical instead of generally cylindrical.

As shown in FIG. 1, the vial liquid housing 30 is supported by the outer support body 20. In the illustrated embodiment, the vial liquid housing 30 has a generally cylindrical configuration around the axis of elongation A, and extends across the interior of the outer support body 20, bisecting the outer support body 20, and extending along the diameter of the inner surface 50. As shown, the vial liquid housing 30 contains a vial housing surface 70. While in some embodiments the vial liquid housing 30 may be shaped similar to a tube vial (e.g., with the vial housing surface 70 being formed as a thin walled cylinder, commonly with a slight barrel shape therein), in other embodiments the vial liquid housing 30 may be formed along with the outer support body 20 as a block vial, where a more complicated shape of the vial housing surface 70 may facilitate implementing a magnifying surface such that the vial housing surface 70 magnifies the interior of the vial liquid housing 30, so as to magnify a bubble floating in the liquid contained in the vial liquid housing 30. While in the illustrated embodiment the generally cylindrical configuration of the vial liquid housing 30 results in the vial housing surface 70 extending in a curved manner from a plane defined by the wall 60 inwards into the outer support body 20 along the inner surface 50, it may be appreciated that other configurations of the vial liquid housing 30 are also possible, including but not limited to a rectangular prism outer shape surrounding the axis of elongation A.

As shown, an open space 75 is therefore present between the inner surface 50 and the vial housing surface 70. The open space 75 may extend inward from the wall 60 in a direction nonparallel to the axis of elongation A. In an embodiment, the open space 75 may extend into the outer support body 20, and in an embodiment may extend generally perpendicular to a plane of symmetry for the level vial 10 that includes the axis of elongation A therein. As the open space 75 extends from the wall 60 into the outer support body 20, it may therefore be appreciated that in the level vial 10, the vial liquid housing 30 is supported within the outer support body 20 without the obstruction of a covering plate enclosing the vial liquid housing 30 and the inner surface 50. While the front and rear of conventional level vials have transparent housing bodies extending across the vial liquid housings therein, the outer support body 20 holds the vial liquid housing 30 in an outwardly exposed and unobstructed configuration relative to the front and/or rear of the level vial 10. It may therefore be appreciated that in embodiments where the vial housing surface 70 is shaped to implement magnifying properties for the vial liquid housing 30, the outwardly exposed and unobstructed configuration of the vial liquid housing 30 as supported by the outer support body allows magnification of the interior of the vial liquid housing 30 visible from opposing faces of the level vial 10, in contrast to conventional level vials where tube vials are enclosed in surrounding housings, or block vials with a flat exterior surface (e.g., circular disks surrounding a squared block vial), which would not facilitate such magnification, or would obscure such magnification.

In some embodiments, the level vial 10 includes an internal support wall 80 connecting the vial liquid housing 30 to the inner surface 50 at regions inward from the opposing ends of the vial liquid housing 30. As shown, such an internal support wall 80 would be recessed by an amount R from the wall 60 into the inner surface 50. It may be appreciated that the internal support wall may be recessed different amounts from the wall 60 on opposing faces of the level vial 10. The various embodiments of the internal support wall 80 may connect between the inner surface 50 and the vial housing surface 70 of the vial liquid housing 30 at different locations to create the recessed region(s). For example, in the illustrated embodiment the internal support wall 80 extends generally perpendicularly to the inner surface 50. It may be appreciated that in other embodiments at least a portion of the internal support wall 80 may extend at a non-perpendicular angle to the inner surface 50. In various embodiments, the internal support wall 80 may be parallel to or may be angled relative to a plane of extension of the wall 60. The internal support wall 80 may extend along axes that form different secants against the vial liquid housing 30 in different embodiments. Cross sections of the internal support wall 80 may be generally planar or may curve, have facets, or may otherwise have complications, cutouts, or other variations in shape in various embodiments.

Figure 8:
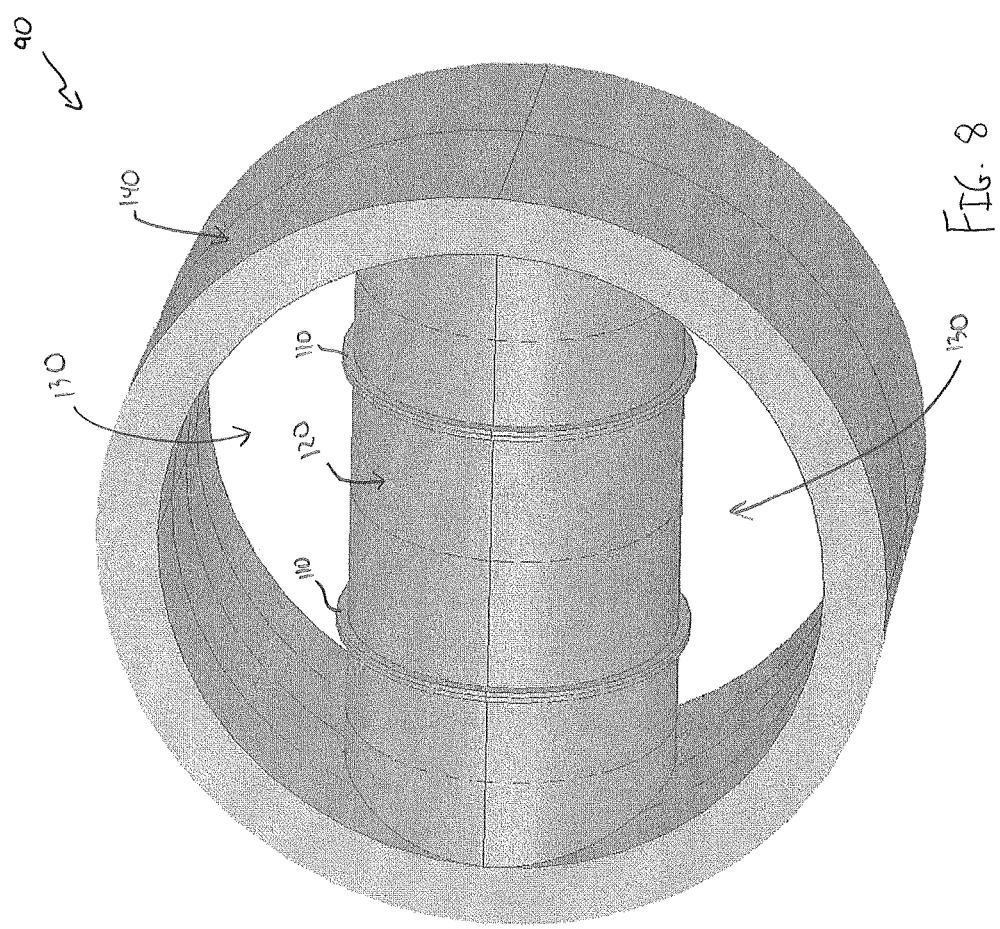
FIG. 8 illustrates a front perspective view of a level vial according to another aspect of the present disclosure.

The internal support wall 80 may cover the entirety of the region between the inner surface 50 and a portion of the vial housing surface 70 of the vial liquid housing 30, as shown, or may form a web like structure with one or more openings therein. In an embodiment, the internal support wall 80 may extend both above and below the vial liquid housing 30 as viewed from the front and/or rear faces thereof, connecting to the inner surface 50 both above and below the horizontal extension of the vial liquid housing 30. In other embodiments the internal support wall 80 may be located on only one side of the horizontal extension of the vial liquid housing 30. As shown in FIG. 8, in some embodiments a level vial 90 may be similar to embodiments of the level vial 10 disclosed herein, but may omit any equivalent to the internal support wall 80.

Figure 9:
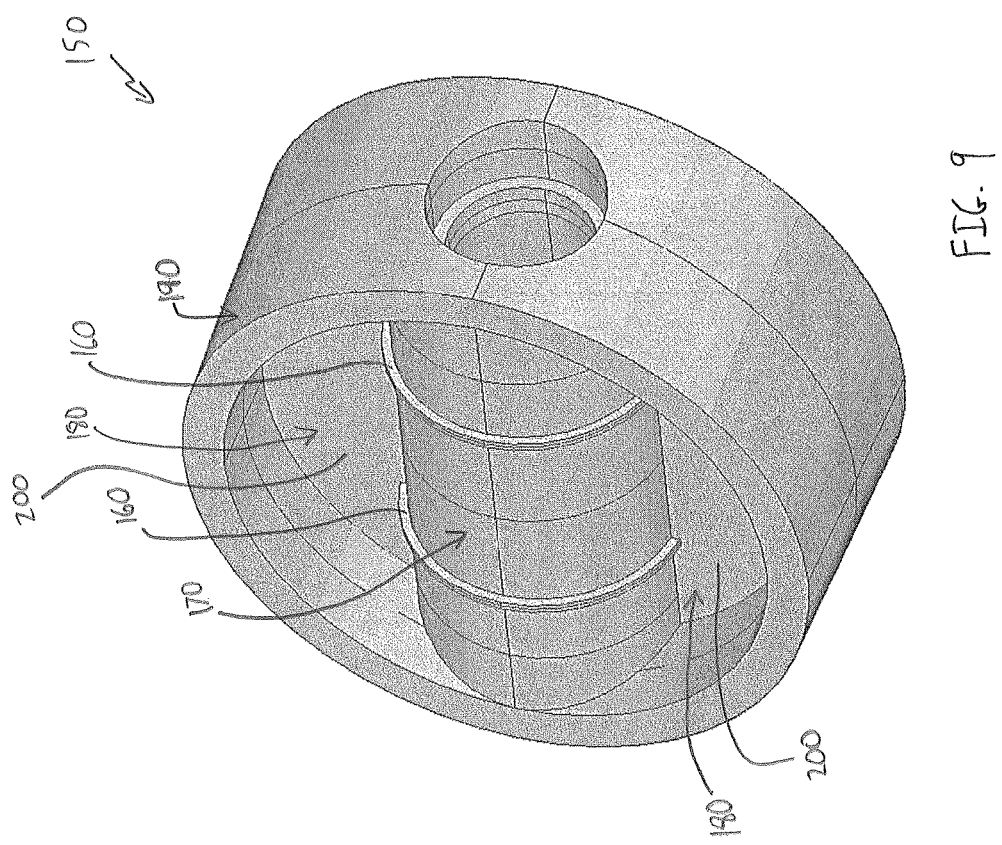
FIG. 9 illustrates a front perspective view of a level vial according to another aspect of the present disclosure.

As shown in the embodiment of the level vial 10 in FIGS. 1-7, the vial liquid housing 30 may include indicia 100 therein which may indicate centering of a bubble floating in liquid filled in the vial liquid housing 30, or may be used to indicate certain pitches of the level. It may be appreciated that the indicia 100 may be applied to or formed on the vial liquid housing 30 in any appropriate manner, including but not limited to being inserted into, etched onto, printed onto, silkscreened onto, molded with, over molded onto, or so on. For example, as shown in the embodiment of the level vial 90 in FIG. 8, indicia 110 may be formed integrally with the level vial 90, encircling the vial liquid housing 120 by extending into the open space 130 between the vial liquid housing 120 and the outer support body 140 thereof. Similarly, FIG. 9 shows an embodiment of a level vial 150, where indicia 160 are formed integrally with the level vial 150, protruding from the vial liquid housing 170 thereof by extending into the recessed regions 180 formed between the vial liquid housing 170, the outer support body 190 and the internal support walls 200 thereof.

Returning to the embodiment of level vial 10 of FIGS. 1-7, it may be appreciated that the interior of the vial liquid housing 30 may have a barrel shape or other shape that is wider at the center while tapered at the ends. It is understood that such a shape facilitates movement of a bubble floating in the vial liquid to indicate a horizontal orientation of the vial liquid housing 30 by the bubble floating between the indicia 100 centered around the widest diameter region of the interior of the vial liquid housing 30. The vial liquid may be of any appropriate form, including but not limited to water, alcohol, or another liquid of desired viscosity and evaporation characteristics, which in some embodiments may be colored so as to facilitate easier viewing contrast between the liquid and the bubble. As shown, an aperture may be formed in the level vial 10 to provide filling access to the vial liquid housing 30, which may be sealed by a plug 210 to generally trap the vial liquid within the vial liquid housing 30 once the vial liquid housing 30 is appropriately filled with the vial liquid and sufficient air for the indicator bubble therein.

Figure 10:
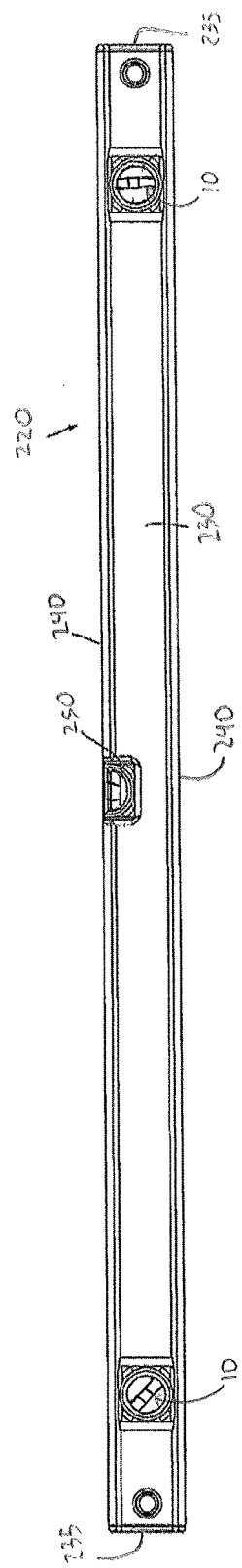
FIG. 10 illustrates an embodiment of a level utilizing the level vial of FIG. 1.

As indicated above, embodiments of the level vials disclosed herein may be installed into a level so that the vial liquid housing thereof is oriented at a particular angle with respect to a reference surface of the level. By way of example, FIG. 10 illustrates a level 220 having an elongated body 230 housing embodiments of the level vial 10 therein. The elongated body 230 may be of any appropriate construction or configuration, including but not limited to plastic (e.g., ABS), metal (e.g., aluminum), or any other appropriate material or combinations thereof. The illustrated embodiment of the level 220 shows a hollow box-beam configuration of elongated body 230 terminated by end caps 235. The elongated body 230 that includes a pair of reference surfaces 240, although it may be appreciated that in some embodiments only a single reference surface 240 may be present (e.g., as in a torpedo level). Other level configurations, such as an I-beam elongated body are possible in various embodiments. In an embodiment, the end caps 235 may themselves serve as reference surfaces, and may be oriented perpendicular to the reference surfaces 240.

As shown, in an embodiment a top vial assembly 250 may be present in some embodiments, which may be of any conventional construction, or may be formed similarly to the level vial 10, however without portions of the outer support body 20 above the vial liquid housing 30 being thereon (such that the outer support body 20 is below and to the sides of the vial liquid housing 30, while the vial liquid housing 30 is generally aligned so as to be flush or with or below the reference surface 240 associated with the top vial assembly 250.

Figure 11:
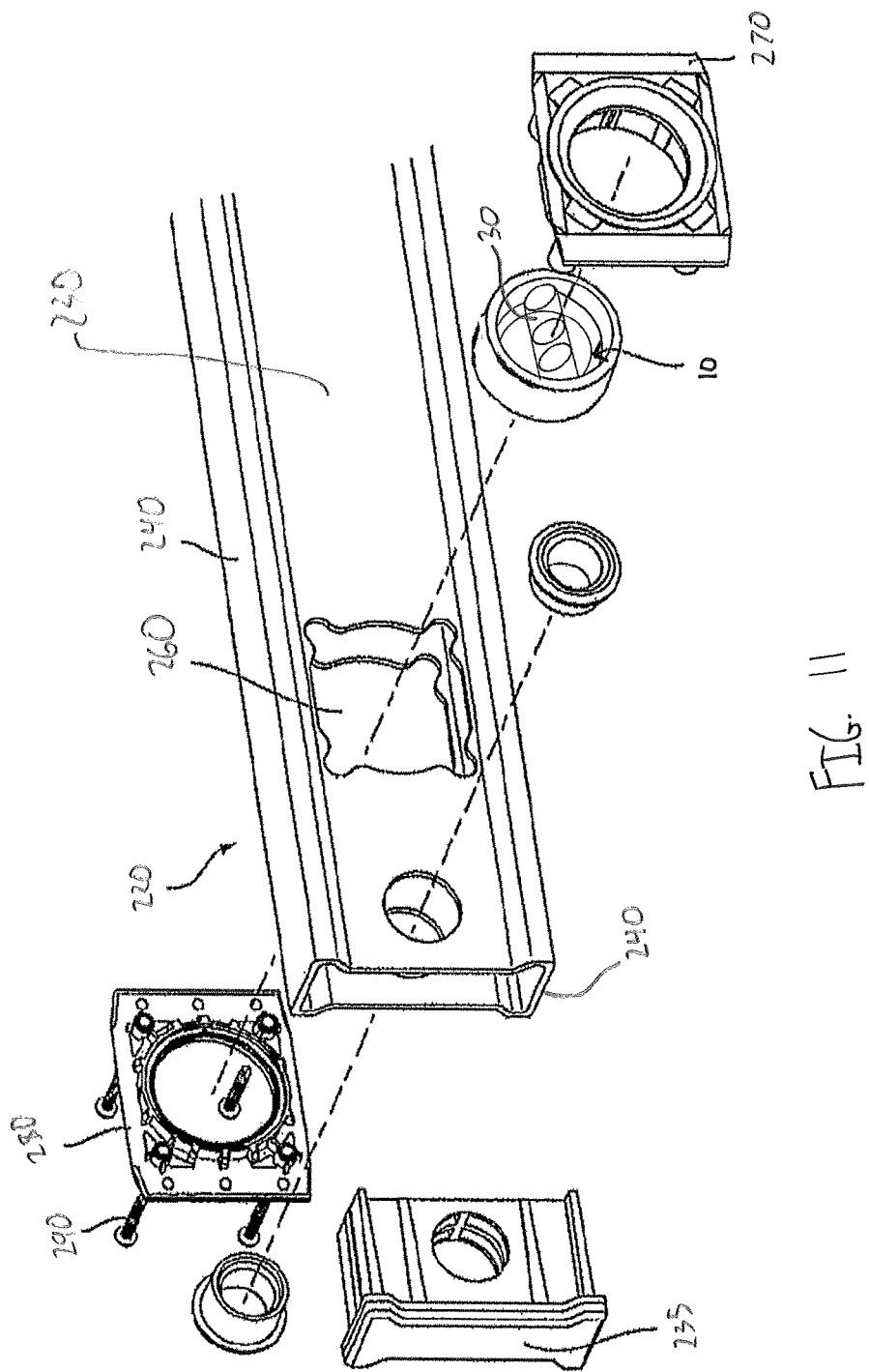
FIG. 11 illustrates a partial exploded view of the level of FIG. 10.

Assembly of an embodiment of the level vial 10 into the level 220 is shown in isolated perspective view in FIG. 11. As shown, the elongated body 230 may contain an opening 260 therein extending between the sidewall(s) thereof. The opening 260 may be any appropriate size sufficient to fit the level vial 10 and a surrounding support assembly therein. In the illustrated embodiment, the support assembly includes cover pieces 270, 280 which may be assembled around the level vial 10 by being secured through opposing faces of the elongated body 230. In an embodiment, such as that illustrated, fasteners 290 may be inserted through the cover pieces 270, 280 and the opening 260 or other portions of the elongated body 230 so as to surround the level vial 10 and hold the level vial 10 to the elongated body 230. The cover pieces 270, 280 may be made from any appropriate material, including but not limited to being molded from a suitable plastic, such as high impact ABS, cast from metal, or so on. In some embodiments an adhesive may be applied between the level and one or more of the cover pieces 270, 280 so as to hold the level vial 10 at a predetermined angled relation with respect to a reference surface 240 (e.g., so that the vial liquid housing 30 is oriented parallel to, perpendicular to, at a 45° angle relative to the reference surface 240, or at any other appropriate angle relative to the reference surface 240). As shown in the assembled embodiment of the level 220, one level vial 10 may be mounted with the vial liquid housing 30 is oriented at a 45° angle relative to the reference surface 240, while the other may be mounted oriented perpendicular to the reference surface 240. Other mountings are possible in various embodiments.

While the illustrated embodiments of the level vial described herein may be configured as a plastic injection molded bodies filled with the vial liquid, it may be appreciated that the level vials described herein may be of different constructions or configurations, including but not limited to one or more being comprised of different material choices. For example, one or more of the level vial, the plug confining the vial liquid in the level vial, other components of the level, or constituent parts of one or more of the above may each be constructed from a variety of materials, including but not limited to one or more plastics, metals, rubbers, elastomers, or any other appropriate material choice. For example, in an embodiment one or more of the components may be formed of acrylics, butyrates, polycarbonate, polyethylene terephthalates (including but not limited to PETG), aluminum (e.g., machined aluminum), iron (e.g., steel), or any other appropriate material. In some embodiments, the material choices may differ from component to component. Additionally, in various embodiments the components described herein may be formed integrally to one another or may be assembled together by any appropriate manner, including but not limited to fasteners, screws, bolts, adhesives, welds, moldings, over moldings, or so on.

Although aspects of the invention have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A level vial comprising:
   an elongated vial liquid housing extending along an axis of elongation and containing a liquid and a bubble therein;
   an outer support body supporting the elongated vial liquid housing, the outer support body being integral with the elongated vial liquid housing, and having an inner surface at least partially surrounding the elongated vial liquid housing;
   an open space between the inner surface and the elongated vial liquid housing; and
   an internal support wall extending between the outer support body and the elongated vial liquid housing;
   wherein the elongated vial liquid housing is shaped such that a horizontal orientation of the axis of elongation causes the liquid to flow such that the bubble floats to a center of the elongated vial liquid housing; and
   wherein the elongated vial liquid housing and the open space are in an outwardly exposed and unobstructed configuration relative to a front face of the level vial.

2. The level vial of claim 1, wherein the elongated vial liquid housing and the open space are further in an outwardly exposed and unobstructed configuration relative to a rear face of the level vial opposite the front face.

3. The level vial of claim 1, wherein the level vial is symmetric about a plane of symmetry parallel to the front face of the level vial and extending through the axis of elongation.

4. The level vial of claim 1, wherein the outer support body has a generally cylindrical or generally frustoconical profile.

5. The level vial of claim 4, wherein the outer support body forms a continuous loop around the elongated vial liquid housing, the continuous loop intersecting the axis of elongation at ends of the elongated vial liquid housing.

6. The level vial of claim 1, wherein the elongated vial liquid housing has a generally cylindrical profile.

7. The level vial of claim 1, wherein the internal support wall extends parallel to but recessed from the front face of the level vial, wherein the open space is formed between the internal support wall, the inner surface of the outer support body, and the elongated vial liquid housing.

8. The level vial of claim 1, wherein the internal support wall is continuous between the elongated level vial housing and the outer support body, recessed from the front face of the level vial.

9. The level vial of claim 1, wherein the internal support wall extends both above and below the elongated level vial housing as viewed from the front face of the level vial.

10. The level vial of claim 1, wherein the internal support wall is integral to the outer support body and the elongated vial liquid housing.

11. The level vial of claim 1, wherein the elongated level vial housing comprises indicia to indicate the center of the elongated level vial housing.

12. The level of claim 11, wherein the indicia surround the center of the elongated level vial housing, such that the bubble would be surrounded by the indicia when the level vial is rotated such that the axis of elongation is in a horizontal orientation.

13. The level vial of claim 11, wherein the indicia are molded into the elongated level vial housing.

14. The level vial of claim 13, wherein the indicia protrude from the elongated level vial housing.

15. The level vial of claim 11, wherein the elongated vial liquid housing is shaped to magnify the bubble visible therein.

16. A level comprising:
   a reference surface; and
   a level vial fixed relative to the reference surface, the level vial comprising:
      an elongated vial liquid housing extending along an axis of elongation and containing a liquid and a bubble therein;
      an outer support body supporting the elongated vial liquid housing, the outer support body being integral with the elongated vial liquid housing, and having an inner surface at least partially surrounding the elongated vial liquid housing;
      an open space between the inner surface and the elongated vial liquid housing; and
      an internal support wall extending between the outer support body and the elongated vial liquid housing of the level vial;
      wherein the elongated vial liquid housing is shaped such that a horizontal orientation of the axis of elongation causes the liquid to flow such that the bubble floats to a center of the elongated vial liquid housing; and
      wherein the elongated vial liquid housing and the open space are in an outwardly exposed and unobstructed configuration relative to a front face of the level vial.

17. The level of claim 16, wherein the level vial is oriented such that a horizontal orientation of the axis of elongation results from the reference surface being oriented one of horizontally, vertically, and at a 45° angle relative to ground.

18. The level of claim 16, wherein the reference surface is formed on a housing of the level, and wherein the level vial is assembled into the housing.

19. The level of claim 16, wherein the internal support wall is continuous between the elongated level vial housing and the outer support body.

20. The level of claim 16, wherein the internal support wall extends both above and below the elongated level vial housing as viewed from the front face of the level vial.

* * * * *